US011258061B2

(12) United States Patent
Chavillon et al.

(10) Patent No.: US 11,258,061 B2
(45) Date of Patent: *Feb. 22, 2022

(54) LITHIUM ELECTROCHEMICAL GENERATOR OF THE LITHIUM-OXYGEN OR LITHIUM-AIR TYPE COMPRISING A SPECIFIC NEGATIVE ELECTRODE MATERIAL

(71) Applicant: COMMISSARIAT À L'ÉNERGIE ATOMIQUE ET AUX ÉNERGIES ALTERNATIVES, Paris (FR)

(72) Inventors: Benoît Chavillon, Grenoble (FR); Ronan Invernizzi, Grenoble (FR); Eric Mayousse, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 89 days.

This patent is subject to a terminal disclaimer.

(21) Appl. No.: 16/661,635

(22) Filed: Oct. 23, 2019

(65) Prior Publication Data

US 2020/0136135 A1 Apr. 30, 2020

(30) Foreign Application Priority Data

Oct. 29, 2018 (FR) ...................................... 1860013

(51) Int. Cl.
| | |
|---|---|
| *H01M 4/36* | (2006.01) |
| *H01M 4/40* | (2006.01) |
| *H01M 4/90* | (2006.01) |
| *H01M 12/02* | (2006.01) |
| *H01M 12/08* | (2006.01) |
| *H01M 4/02* | (2006.01) |
| *H01M 4/86* | (2006.01) |

(52) U.S. Cl.
CPC ......... *H01M 4/405* (2013.01); *H01M 4/9016* (2013.01); *H01M 12/02* (2013.01); *H01M 12/08* (2013.01); *H01M 2004/027* (2013.01); *H01M 2004/8689* (2013.01); *H01M 2300/0025* (2013.01)

(58) Field of Classification Search
CPC .......... H01M 4/405; H01M 4/40; H01M 4/38; H01M 4/362; H01M 4/9016; H01M 12/02; H01M 12/06; H01M 12/08; H01M 2004/027; H01M 2004/8689; H01M 2004/8684; H01M 2300/0025
See application file for complete search history.

(56) References Cited

U.S. PATENT DOCUMENTS

| | | | | |
|---|---|---|---|---|
| 3,914,133 A * | 10/1975 | Baldwin | ................. | H01M 6/36 |
| | | | | 429/103 |
| 4,190,704 A * | 2/1980 | Miles | ...................... | H01M 4/38 |
| | | | | 429/103 |
| 2012/0202033 A1* | 8/2012 | Chang | ................... | H01G 11/44 |
| | | | | 428/219 |
| 2013/0224569 A1 | 8/2013 | Sakai et al. | | |
| 2016/0172714 A1* | 6/2016 | Ouchi | ................. | H01M 10/399 |
| | | | | 429/50 |
| 2020/0136134 A1* | 4/2020 | Chavillon | ............. | H01M 4/505 |

OTHER PUBLICATIONS

Search Report for French Application No. 1860013 dated Jul. 31, 2019.

* cited by examiner

*Primary Examiner* — Raymond Alejandro
(74) *Attorney, Agent, or Firm* — Pearne & Gordon LLP

(57) ABSTRACT

A lithium-air or lithium-oxygen electrochemical generator comprising at least one electrochemical cell comprising a positive electrode, a negative electrode and an electrolyte conducting lithium ions disposed between the negative electrode and the positive electrode wherein the negative electrode comprises, as active material, a lithium and calcium alloy.

15 Claims, 1 Drawing Sheet

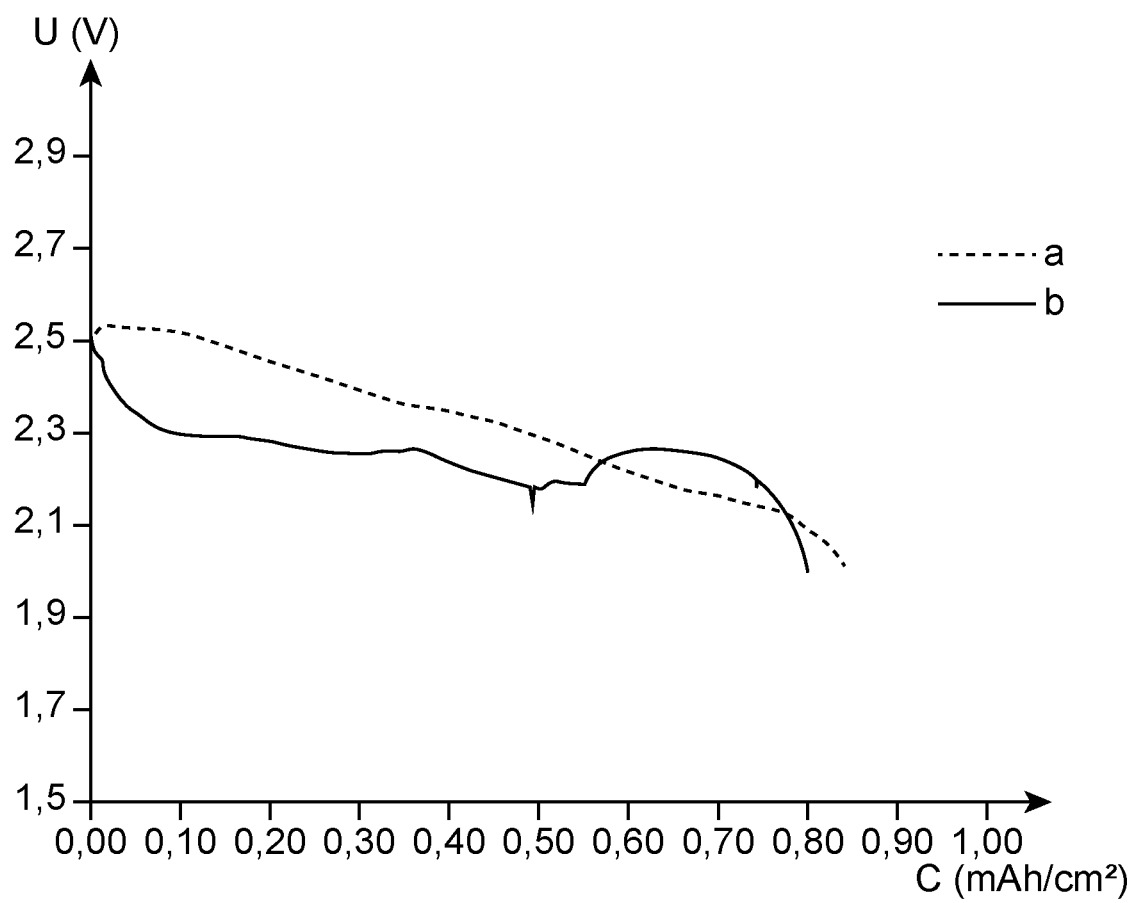

LITHIUM ELECTROCHEMICAL GENERATOR OF THE LITHIUM-OXYGEN OR LITHIUM-AIR TYPE COMPRISING A SPECIFIC NEGATIVE ELECTRODE MATERIAL

CROSS-REFERENCE TO RELATED APPLICATIONS

This application claims priority from French Patent Application No. 18 60013 filed on Oct. 29, 2018. The content of this application is incorporated herein by reference in its entirety.

TECHNICAL FIELD

The present invention relates to a lithium electrochemical generator of the lithium-oxygen or lithium-air type, comprising, in a cell, a specific negative electrode material that has effective electrochemical properties while being able to have a thinner electrode thickness than an electrode comprising solely metallic lithium and thus having a particular advantage for power applications.

This generator may be a primary electrochemical generator (or battery), when it is not rechargeable, or a secondary electrochemical generator (that is to say in other words an accumulator) when it is rechargeable.

The field of the invention can be defined as that of energy storage devices, in particular that of electrochemical generators of the lithium-air or lithium-oxygen type.

PRIOR ART

Energy storage devices are conventionally electrochemical generators functioning on the principle of electrochemical cells able to deliver an electric current by means of the presence in each of them of a pair of electrodes (respectively a positive electrode and a negative electrode) separated by an electrolyte, the electrodes comprising specific materials able to react in an oxidation-reduction reaction, by means of which there is a production of electrons giving rise to the electric current and productions of ions that will circulate from one electrode to the other by means of an electrolyte.

Devices of this type may be lithium-air or lithium-oxygen electrochemical generators, which are conventionally composed, at each basic electrochemical cell, of a negative electrode formed by a lithium material, in particular metallic lithium, and a positive electrode of the air electrode type separated by an electrolyte conducting lithium ions, the oxygen of the air constituting the active material of the electrode.

The functioning of an electrochemical cell of a lithium-air or lithium-oxygen electrochemical generator is based more precisely on a reduction of the oxygen at the positive electrode by the Li$^+$ ions present in the electrolyte and coming from the negative electrode and on an oxidation of the metallic lithium at the negative electrode, during the discharge process, the reactions taking place at the electrodes being able to be represented, when the electrolyte is a non-aqueous or completely solid electrolyte, by the following electrochemical equations:

*at the positive electrode (air electrode):

$$2Li^+ + 2e^- + O_{2(g)} \rightarrow Li_2O_2(s) (2.91 \text{ V vs } Li^+/Li)$$

$$2Li^+ + 2e^- + (\tfrac{1}{2})O_2(g) \rightarrow Li_2O(s) (3.10 \text{ V vs } Li^+/Li)$$

*at the negative electrode:

$$Li_{(s)} \rightarrow Li^+ + e^-$$

In a variant, when the electrode is an aqueous electrolyte, the discharge reaction at the positive electrode is as follows:

$$4Li^+ + O_2 + 2H_2O \rightarrow 4LiOH$$

Oxygen, which constitutes the active material of the positive electrode, is a lightweight powerful oxidant that has the major advantage of being freely available. What is more, according to the design of the system, it is possible not to store it in the electrochemical generator, that is to say to take it directly from the atmosphere through the use of an air positive electrode able to take off the oxygen. This type of technology can therefore develop energy densities of around 11,680 Wh/kg in theory and greater than 1000 Wh/kg in practice. The power density of this type of technology is, on the other hand, lower compared with the other generator systems, this power density for lithium-air or lithium-oxygen electrochemical generators being able to range up to 500 W/kg, which is approximately around 50% less compared with the maximum obtained with an accumulator of the lithium-ion power type. The operating temperature range of this type of generator is identical to that obtained with the majority of lithium-ion accumulators and is preferably defined between −20° C. and +80° C. depending on the electrolytes and salts used.

Metallic lithium, which conventionally constitutes the active material of the negative electrode, is a material that can be used in the majority of systems since its energy per unit mass and volume is so great. This is because lithium has a density of 0.534 g/cm$^3$ and an energy per unit mass of 3861 mAh/g as well as an energy density per unit volume of 2061 mAh/cm$^3$. These values remain very high compared with those obtained with other negative-electrode materials, in particular through the reaction Li→Li$^+$+e$^-$, this reaction involving the exchange of a single electron per lithium atom, which is very light, thus generating a large quantity of energy for a low volume/mass ratio.

The main drawback relating to the use of lithium is due firstly to the possible formation of lithium peroxide during the discharge processes and secondly to the possible formation of lithium dendrites during repeated charging processes, which may short-circuit the electrochemical generator and damage it.

Moreover, lithium may pose safety problems, because of its melting point of 180° C., and may present difficulties in handling for manufacturing the negative electrodes.

This is because lithium is a highly reactive metal, in particular when it is subjected to an environment comprising water, nitrogen and/or oxygen and has an ability to adhere to all types of metals or alloys, such as stainless steel, steel or even certain fluorinated polymers. Thus it may prove difficult to handle and to shape, for example by rolling or extrusion, unless particular precautions are taken, in particular by working in a neutral atmosphere devoid of moisture and/or working with tools coated with a layer of non-reactive polymer, such as low-density polyethylene.

Finally, for use in electrochemical generators of the lithium-air or lithium-oxygen type, it may be advantageous to use, in order to form the negative electrode, very thin strips of lithium, for example with a thickness ranging from 10 to 50 μm, with a view in particular to increasing the power density. However, such a thickness is impossible to achieve with standard rolling mills and, when such strips are available commercially, they are very expensive, even when they are already prelaminated on current collectors (for example a copper strip).

Thus, in the light of the drawbacks mentioned above and in particular those relating to the difficulty of handling lithium in order to produce thin negative electrodes, the authors of the present invention have set themselves the objective of proposing a novel type of lithium-air or lithium-oxygen electrochemical generator comprising a specific negative electrode.

DISCLOSURE OF THE INVENTION

Thus the invention relates to a lithium-air or lithium-oxygen electrochemical generator comprising at least one electrochemical cell comprising a positive electrode, a negative electrode and an electrolyte conducting lithium ions disposed between said negative electrode and said positive electrode, characterised in that the negative electrode comprises, as active material, a lithium and calcium alloy, the lithium and calcium alloy preferably being a lithium alloy comprising calcium to the extent of 2% to 34% atomic.

Before going into more detail in the disclosure of this invention, the following definitions are given.

Lithium-air or lithium-oxygen electrochemical generator means, conventionally, above and hereinafter, an electrochemical generator that is supplied with oxygen, which constitutes the active material of the positive electrode, either by means of air (which by its nature, contains oxygen), the electrochemical generator then being termed a lithium-air electrochemical generator, or by pure oxygen, the electrochemical generator then being termed a lithium-oxygen electrochemical generator. When the electrochemical generator is not rechargeable, it may be termed a primary electrochemical generator (or battery) and when it is rechargeable it may be termed a secondary electrochemical generator (or accumulator).

Negative electrode means, conventionally, above and hereinafter, the electrode that serves as an anode when the electrochemical generator is supplying current (that is to say when it is in the process of discharging) and which serves as a cathode when the electrochemical generator is in the process of charging (in the latter case, the electrochemical generator may be termed an accumulator because it can be subjected to a charging or discharging process).

Positive electrode means conventionally, above and hereinafter, the electrode that serves as a cathode when the electrochemical generator is supplying current (that is to say when it is in the process of discharging) and which serves as an anode when the electrochemical generator is in the process of charging (in the latter case, the electrochemical generator may be termed an accumulator because it may be subjected to a charging or discharging process).

Active material of the negative electrode means, conventionally, above and hereinafter, the material that is directly involved in the oxidation reaction taking place at the negative electrode, this active material being, in the context of this invention, a lithium and calcium alloy.

The negative electrode comprising such an active material can easily be prepared by rolling and have low thicknesses compatible with obtaining an improvement in the power density.

More specifically, the negative electrode may consist solely of the active material, which is the lithium and calcium alloy as mentioned above.

From a structural point of view, the negative electrode may be in the form of a sheet or plate having a thickness ranging from 5 to 200 μm, more specifically from 20 to 100 μm.

Advantageously, the lithium and calcium alloy constituting the active material of the negative electrode is an alloy comprising solely lithium and calcium.

More specifically, the lithium and calcium alloy may preferably be a lithium alloy comprising calcium to the extent of 2% to 34% atomic (which means, in other words, that, when the lithium and calcium alloy comprises solely lithium and calcium, the lithium is present in the alloy to the extent of 66% to 98% atomic), preferably from 2% to 15% atomic (which means, in other words, that, when the lithium and calcium alloy comprises solely lithium and calcium, the lithium is present in the alloy to the extent of 85% to 98% atomic).

The calcium in the lithium and calcium alloy may be wholly or partly in the form of $CaLi_2$. In the latter case, the lithium and calcium alloy may be considered to be a material comprising a lithium matrix wherein all or some of the calcium is in the form of $CaLi_2$ inclusions in the lithium matrix.

The authors of the present invention have been able to show that such an alloy is easily laminated and has good mechanical properties, in particular in terms of tensile strength, especially for thicknesses as defined above.

% atomic means, conventionally, in the above and hereinafter, the ratio corresponding to (total number of calcium atoms/total number of atoms of the alloy)*100.

Advantageously, the negative electrode may be self-supporting, that is to say it does not require to be placed on a support in order to be used in the electrochemical generator of the invention and, more specifically, does not require to be placed on a current collector (which means, in other words, that the electrochemical generator has no current collector at the negative electrode). In a variant, it may be associated with a support, for example of the current collector type, which may be a strip or a grille made from at least one electrically conductive metal element, such as copper, nickel, aluminium or stainless steel.

The positive electrode of the electrochemical generator of the invention is conventionally an air or oxygen electrode.

At this air or oxygen electrode, when the electrolyte is a non-aqueous or entirely solid electrolyte, the oxygen is reduced during discharge of the cell in accordance with the following electrochemical equations:

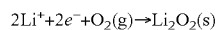

$$2Li^+ + 2e^- + O_2(g) \rightarrow Li_2O_2(s)$$

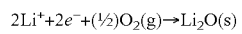

$$2Li^+ + 2e^- + (\tfrac{1}{2})O_2(g) \rightarrow Li_2O(s)$$

The air or oxygen electrode is intended to be in direct contact with the oxygen, with a view to allowing the reduction thereof, and must therefore conventionally have catalytic sites allowing the exchange of electrons, which results in the following properties:

diffusion of oxygen in gaseous form;
electron conductivity;
large catalytic surface area;
good wettability by the electrolyte; and
good mechanical strength.

From a structural point of view, a positive electrode able to form part of an electrochemical generator according to the invention may comprise:

at least one electron-conducting material;
optionally at least one catalyst; and
optionally at least one binder.

The electron conducting material may preferably be a carbon material, namely a material comprising carbon in the elementary state.

Mention can be made, as carbon material, of:

graphite;
mesocarbon beads;
carbon fibres;

carbon black, such as acetylene black, tunnel black, furnace black, lamp black, anthracene black, coal black, gas black, thermal black);

graphene;

carbon nanotubes; and mixtures thereof.

Said carbon material may be present to the extent of 80% to 100% by mass of the total mass of the electrode.

In particular, the positive electrode may comprise, as electron-conducting material, a carbon material with a large specific surface area (the positive electrode being able to be, even exclusively, composed of such a material), such as a fabric of carbon fibres or carbon nanotubes.

The electron-conducting material may also be an electron-conducting ceramic belonging to the family of nitrides of transition element(s), such as TiN, carbides of transition element(s) and/or metalloid element(s), such as TiC or SiC, carbonitrides of transition element(s), such as TiCN, simple oxides of transition element(s), such as TiO, ZnO or $Cu_2O$, or mixed oxides of transition element(s) such as $NiCo_2O_4$ or $MnCo_2O_4$.

The electron-conducting material may possibly contain both a carbon material as mentioned above and an electron-conducting ceramic, as mentioned above.

When it is present, the aforementioned catalyst is, from a functional point of view, a catalyst able to accelerate the electrochemical reactions occurring at the air or oxygen electrode (whether discharging or charging is taking place) and also able to increase the operational voltage at which these electrochemical reactions take place.

A catalyst meeting these specificities may be:

a catalyst consisting of a transition metal with a degree of oxidation 0, such as cobalt, and more specifically a noble metal with a degree of oxidation 0 such as platinum, gold, palladium, ruthenium or alloys thereof, such as a Pt—Au alloy;

a catalyst comprising a simple ruthenium oxide, such as $RuO_2$, a simple manganese oxide such as $MnO_2$ or $Mn_2O_3$, a simple oxide of iron such as $Fe_3O_4$ or $Fe_2O_3$, a simple oxide of cobalt such as $Co_3O_4$ or a simple oxide of copper, such as CuO;

a catalyst comprising a mixed oxide of cobalt, such as $CoFe_2O_4$, a mixed oxide of manganese such as $LaMnO_3$ or a mixed oxide of nickel such as $LaNiO_3$; or mixtures thereof.

When it is present, the catalyst may be present, in the positive electrode, in a proportion by mass ranging up to 20% by mass with respect to the total mass of the positive electrode.

To ensure cohesion of the positive electrode, the positive electrode may comprise one or more binders, in particular one or more polymeric binders.

Among the polymeric binders able to be used, mention can be made of:

*fluorinated (co)polymers, optionally proton conducting, such as:

fluorinated polymers, such as a polytetrafluoroethylene (known by the abbreviation PTFE) or a polyvinylidene fluoride (known by the abbreviation PVDF);

fluorinated copolymers, such as a polyvinylidene fluoride-co-hexafluoropropene) (known by the abbreviation PVDF-HFP);

proton-conducting fluorinated polymers, such as Nafion®;

*elastomer polymers, such as a styrene-butadiene copolymer (known by the abbreviation SBR) or an ethylene-propylene-diene monomer copolymer (known by the abbreviation EPDM);

*polymers in the polyvinyl alcohol family;

*cellulosic polymers, such as a sodium carboxymethyl cellulose; and

*mixtures thereof.

Preferably the binder used is a binder based on a fluorinated polymer, such as a polytetrafluoroethylene, a polyvinylidene fluoride and mixtures thereof, this type of binder making it possible to obtain a good percolating lattice.

Apart from the presence of at least one electron-conducting material, optionally at least one catalyst and optionally at least one binder, the positive electrode being associated with a support intended, as its name indicates, to support the aforementioned ingredients, this support furthermore being able to help to ensure good mechanical strength of the electrode and good electron conduction (this support being able to be termed a current-collector support) and to allow the diffusion of the gases, in particular oxygen. This type of electrode can therefore be referred to as supported.

This support may be in the form of a foam, a grille or a fibre support and may be made from a material comprising a metal or a metal alloy or a carbon material.

It may particularly be a carbon support, a titanium support, a palladium support, a copper support, a gold support, an aluminium support, a nickel support or a stainless-steel support.

The electrolyte intended to form part of the electrochemical generators of the invention may be an aqueous liquid electrolyte (that is to say at least one solvent is water) or non-aqueous (that is to say not comprising water).

More specifically, when the electrolyte is an aqueous liquid electrolyte, it may comprise:

a single solvent, water;

at least one lithium salt, such as LiOH, LiCl, $LiH_2PO_4$, $Li_3PO_4$, $LiNO_3$;

optionally at least one mineral acid such as $HClO_3$, $HClO_4$, $HNO_3$, $H_2SO_4$, HBr, HCl or organic acid such as formic acid HCOOH or acetic acid $CH_3COOH$.

When the electrolyte is a non-aqueous liquid electrolyte, it may comprise:

as solvent(s), one or more organic solvents chosen from carbonate solvents, ether solvents, sulfone solvents, sulfoxide solvents, lactone solvents, lactam solvents, nitrile solvents, fluorinated solvents and mixtures thereof;

at least one lithium salt;

optionally an additive other than a lithium salt.

By way of examples, the lithium salt may be chosen from the group consisting of $LiPF_6$, $LiClO_4$, $LiBF_4$, $LiAsF_6$, $LiSbF_6$, $LiAlCl_4$, $LiGaCl_4$, $LiCF_3SO_3$, $LiC(SO_2CF_3)_3$, lithium bis(trifluoromethylsulfonyl)imide (known by the abbreviation LiTFSI), $LiN[SO_2CF_3]_2$, LiSCN, lithium nitrate $LiNO_3$, lithium bis(oxalato)borate (known by the abbreviation LIBOB), lithium bis(fluorosulfonyl)imide (known by the abbreviation LiFSI), $LiPF_3(CF_2CF_3)_3$ (known by the abbreviation LiFAP), lithium trifluoromethanesulfonate $LiCF_3SO_3$ (known by the abbreviation LiTf), lithium fluorosulfonate $LiSO_3F$, $LiC_6F_5SO_3$, $LiO_3SCF_2CF_3$, $LiO_2CCF_3$, $LiB(C_6H_5)_4$ and the mixtures thereof.

The lithium salt may be included, in the electrolyte, to the extent of 0.3 M to 2 M.

As an organic solvent belonging to the family of carbonate solvents, mention can be made of ethylene carbonate (known by the abbreviation EC), propylene carbonate (known by the abbreviation PC), dimethyl carbonate (known by the abbreviation DMC), diethyl carbonate (known by the abbreviation DEC) and the mixtures thereof.

As organic solvent belonging to the family of ether solvents, mention can be made of dimethoxyethane (known by the abbreviation DME), tetraglyme or tetraethylene glycol dimethylether (known by the abbreviation TEGDME) or methoxybenzene.

As an organic solvent belonging to the family of sulfone solvents, mention can be made of ethylmethylsulfone (known by the abbreviation EMS), trimethylenesulfone (known by the abbreviation TriMS), 1-methyltrimethylenesulfone (known by the abbreviation MTS), ethyl-sec-butylsulfone (known by the abbreviation EiBS), ethyl-isopropylsulfone (known by the abbreviation EiPS) and also 3,3,3-trifluoropropylmethylsulfone (known by the abbreviation FPMS).

As an organic solvent belonging to the family of sulfoxide solvents, mention can be made of dimethylsulfoxide (known by the abbreviation DMSO).

As an organic solvent belonging to the family of lactone solvents, mention can be made of γ-butyrolactone, γ-valerolactone, δ-valerolactone, ε-caprolactone and γ-caprolactone.

As an organic solvent belonging to the family of lactam solvents, mention can be made of N-methyl-2-pyrrolidone (known by the abbreviation NMP).

As an organic solvent belonging to the family of nitrile solvents, mention can be made of acetonitrile.

As an organic solvent belonging to the family of fluorinated solvents, mention can be made of perfluorodecaline and perfluorooctanol.

The solvent may be used in the form of a single solvent or a mixture of separate solvents (able to thus form a binary solvent or a ternary solvent).

For example, the solvent may consist of a mixture of at least one fluorinated solvent and at least one carbon solvent. More specifically, it may be a ternary solvent able to comprise three solvents, a specific example being the ternary solvent consisting of a mixture comprising perfluorodecaline, perfluorooctanol and ethylene carbonate.

As an additive other than a lithium salt, mention can be made of fluoroethylene carbonate (known by the abbreviation FEC), 2,2,6,6-tetramethylpiperidinyloxyl (known by the abbreviation TEMPO) and polydopamine.

The aforementioned liquid electrolyte may, in the electrochemical cells of the electrochemical generators of the invention, be caused to impregnate a separator, which is disposed between the positive electrode and the negative electrode of the electrochemical cell.

This separator may be made from a porous material able to accept the liquid electrolyte in its porosity.

This separator may consist of a membrane made from a material chosen from glass fibres (and more specifically a non-woven fabric of glass fibres), a polymeric material such as a polyterephthalate (such as an ethylene polyterephthalate, known by the abbreviation PET), a polyolefin (for example a polyethylene or a polypropylene), a polyvinyl alcohol, a polyamide, a polytetrafluoroethylene (known by the abbreviation PTFE), a polyvinyl chloride (known by the abbreviation PVC), or a polyvinylidene fluoride (known by the abbreviation PVDF). The separator may have a thickness ranging from 5 to 300 μm.

The electrolyte may also be an ionic liquid, for example 1-methyl-1-propylpiperidinium bis(trifluoromethylsulfonyl)imide, 1-n-butyl-1-methylpyrrolidinium bis(trifluoromethylsulfonyl)imide, and mixtures thereof.

The electrolyte may also consist of a solid electrolyte, for example a ceramic membrane conducting lithium ions, conventionally referred to as LISICON (corresponding to the English terminology Lithium Super Ionic Conductor), this ceramic membrane being able to be of the perovskite type such as $(La,Li)TiO_3$ (known by the abbreviation LLTO), of the garnet type such as $Li_5La_3Ta_2O_{12}$, $Li_6La_3Zr_2O_{11.5}$, of the phosphate type such as $Li_{1+x}Al_xGe_{2-x}(PO_4)_3$ with $0<x<0.8$ (known by the abbreviation LAGP), $Li_{1+x}Ti_{2-x}Al_x(PO_4)_3$ with $0.25<x<0.3$ and $Li_{1+x+y}Al_xSi_y(PO_4)_{3-y}$ with $0.2<x<0.25$ and $0<y<0.05$ (known by the abbreviation LTAP).

The electrolyte may also be a polymer electrolyte comprising at least one polymer resulting from the polymerisation of one or more monomers, such as vinylidene fluoride or hexafluoropropylene, and comprising at least one lithium salt such as at least one of those mentioned above with regard to non-aqueous liquid electrolytes.

The electrochemical generators of the invention may be included in a sealed enclosure supplied with air or oxygen with a view to the functioning thereof.

The electrochemical generators of the invention may further comprise a membrane selective to oxygen and which can make it possible to selectively route the oxygen to the positive electrode. This membrane may consist of one or more polymers, such as a polydimethylsiloxane (known by the abbreviation PDMS), a polysulfone (known by the abbreviation PS), a polyacrylonitrile (known by the abbreviation PAM), a cellulose acetate, a polyethersulfone (known by the abbreviation PES), a polyetherimide (known by the abbreviation PEI), a polyamide (known by the abbreviation PA), a polyvinylidene fluoride (known by the abbreviation PVDF), an ethylene polyterephthalate (known by the abbreviation PET) or mixtures thereof.

An electrochemical generator specific to the invention is a generator comprising at least one electrochemical cell comprising:
- a negative electrode consisting of a sheet of lithium and calcium alloy comprising a calcium content of 2% atomic, said sheet having a thickness of 100 μm;
- a positive electrode consisting of a fabric of carbon fibres; and
- a porous separator disposed between said negative electrode and said positive electrode, said separator being impregnated with an electrolyte comprising a lithium salt LiTFSI in a mixture of three solvents comprising perfluorodecaline, perfluorooctanol and propylene carbonate.

The electrochemical generators of the invention may be produced by conventional techniques within the capability of a person skilled in the art, for example by stacking various elements constituting the electrochemical generator (namely a negative electrode, positive electrode and separator), this stack being able to be held in a casing. The alloy constituting the negative electrode may be produced by fusion of lithium and calcium, for example on a heated plate, at a temperature that may range from 140° to 500° C., in a neutral atmosphere (for example an argon atmosphere), followed, after mixing, by quenching of the molten mixture in order to rapidly form the alloy. The alloy thus obtained may be shaped into a plate or sheet by rolling with a view to forming part of the negative electrode.

The invention will now be described with reference to the following example given by way of indication and non-limitatively.

BRIEF DESCRIPTION OF THE SINGLE FIGURE

The single FIGURE is a graph illustrating the change in the discharge voltage U (in V) at 30 µA as a function of the surface capacity C (in mAh par cm² of positive electrode) for the electrochemical generator according to the invention (curve a) and for the electrochemical generator not in accordance with the invention (curve b) of the example disclosed below.

DETAILED DISCLOSURE OF A PARTICULAR EMBODIMENT

Example

The following example illustrates a lithium-air electrochemical generator in the form of a button battery comprising:
- a negative electrode consisting of a disc with a diameter of 16 mm and a thickness of 100 µm and composed of a lithium and calcium alloy with calcium to the extent of 2% atomic;
- a positive electrode consisting of a disc 14 mm in diameter and 200 µm thickness composed of a fabric of carbon fibres of the Freudenberg H2315 type;
- between the negative electrode and the positive electrode, a Celgard 2400° separator in the form of a 16 mm diameter disc, said separator being impregnated with an electrolyte (300 µL) consisting of a mixture of perfluorodecaline/perfluorooctanol/propylene carbonate solvents in respective proportions by mass of 2.55/2.4/0.45 and a lithium salt 1 M LiTFSI.

By way of comparison, another lithium-air electrochemical generator not in accordance with the invention was produced in this example, this electrochemical generator meeting the same specificities as that of the invention except that the negative electrode is made from pure lithium.

These two electrochemical generators are supplied with a flow of oxygen of 0.6 ml/min at a pressure of 1 bar.

For these two electrochemical generators, the change in the discharge voltage U (in V) at 30 µA is determined as a function of the surface capacity C (in mAh per cm² of positive electrode), the results being set out in the accompanying single FIGURE (curve a) for the electrochemical generator according to the invention and curve b) for the electrochemical generator not in accordance with the invention).

For the electrochemical generator according to the invention, the discharge potential is similar to that of the electrochemical generator using a negative electrode made solely from lithium, which demonstrates that the electrode comprising calcium is as functional as a lithium electrode in such a system.

Furthermore, the presence of calcium in the lithium alloy constituting the negative electrode helps to make the alloy easier to roll than pure lithium, which makes it possible to envisage the use of such an alloy for forming thinner negative electrodes and thus larger developed surfaces, which may prove a major asset in electrochemical generators intended for power applications.

The invention claimed is:

1. Lithium-air or lithium-oxygen electrochemical generator comprising at least one electrochemical cell comprising a positive electrode, a negative electrode and an electrolyte conducting lithium ions disposed between said negative electrode and said positive electrode, characterised in that the negative electrode comprises, as active material, a lithium and calcium alloy, the lithium and calcium alloy being a lithium alloy comprising calcium to the extent of 2% to 34% atomic.

2. Lithium-air or lithium-oxygen electrochemical generator according to claim 1, wherein the negative electrode consists solely of the active material, which is the lithium and calcium alloy.

3. Lithium-air or lithium-oxygen electrochemical generator according to claim 1, wherein the negative electrode is in the form of a sheet or plate having a thickness ranging from 5 to 200 µm.

4. Lithium-air or lithium-oxygen electrochemical generator according to claim 1, wherein the lithium and calcium alloy comprises solely lithium and calcium.

5. Lithium-air or lithium-oxygen electrochemical generator according to claim 1, wherein the lithium and calcium alloy is a lithium alloy comprising calcium to the extent of 2% to 15% atomic.

6. Lithium-air or lithium-oxygen electrochemical generator according to claim 1, wherein the calcium in the lithium and calcium alloy is wholly or partly in the form of $CaLi_2$.

7. Lithium-air or lithium-oxygen electrochemical generator according to claim 1, wherein the negative electrode is self-supporting.

8. Lithium-air or lithium-oxygen electrochemical generator according to claim 1, wherein the positive electrode is an air or oxygen electrode.

9. Lithium-air or lithium-oxygen electrochemical generator according to claim 1, wherein the positive electrode comprises:
   - at least one electron-conducting material;
   - optionally at least one catalyst; and
   - optionally at least one binder.

10. Lithium-air or lithium-oxygen electrochemical generator according to claim 9, wherein the electron conducting material is a carbon material chosen from graphite, mesocarbon beads, carbon fibres, carbon black, graphene, carbon nanotubes and mixtures thereof.

11. Lithium-air or lithium-oxygen electrochemical generator according to claim 9, wherein the at least one catalyst is:
   - a catalyst consisting of a transition metal with a degree of oxidation 0, such as cobalt, and more specifically a noble metal with a degree of oxidation 0 such as platinum, gold, palladium, ruthenium or alloys thereof, such as a Pt—Au alloy;
   - a catalyst comprising a simple ruthenium oxide such as $RuO_2$, a simple manganese oxide such as $MnO_2$ or $Mn_2O_3$, a simple iron oxide such as $Fe_3O_4$ or $Fe_2O_3$, a simple cobalt oxide such as $Co_3O_4$ or a simple copper oxide such as CuO;
   - a catalyst comprising a mixed cobalt oxide such as $CoFe_2O_4$, a mixed manganese oxide such as $LaMnO_3$ or a mixed nickel oxide such as $LaNiO_3$; or
   - mixtures thereof.

12. Lithium-air or lithium-oxygen electrochemical generator according to claim 1, wherein the at least one binder is a polymeric binder.

13. Lithium-air or lithium-oxygen electrochemical generator according to claim 1, wherein the electrolyte is an aqueous or non-aqueous liquid electrolyte, an ionic liquid, a solid electrolyte or a polymer electrolyte.

14. Lithium-air or lithium-oxygen electrochemical generator according to claim 1, wherein the electrolyte is a non-aqueous liquid electrolyte.

15. Lithium-air or lithium-oxygen electrochemical generator according to claim 1, wherein the electrolyte is a non-aqueous liquid electrolyte, which comprises:
- as solvent(s), one or more organic solvents chosen from carbonate solvents, ether solvents, sulfone solvents, sulfoxide solvents, lactone solvents, lactam solvents, nitrile solvents, fluorinated solvents and mixtures thereof;
- at least one lithium salt;
- optionally an additive other than a lithium salt.

* * * * *